Sept. 3, 1929.  R. B. WASSON  1,726,599
METHOD OF AND MEANS FOR REGULATING SPEED
Filed Nov. 20, 1925
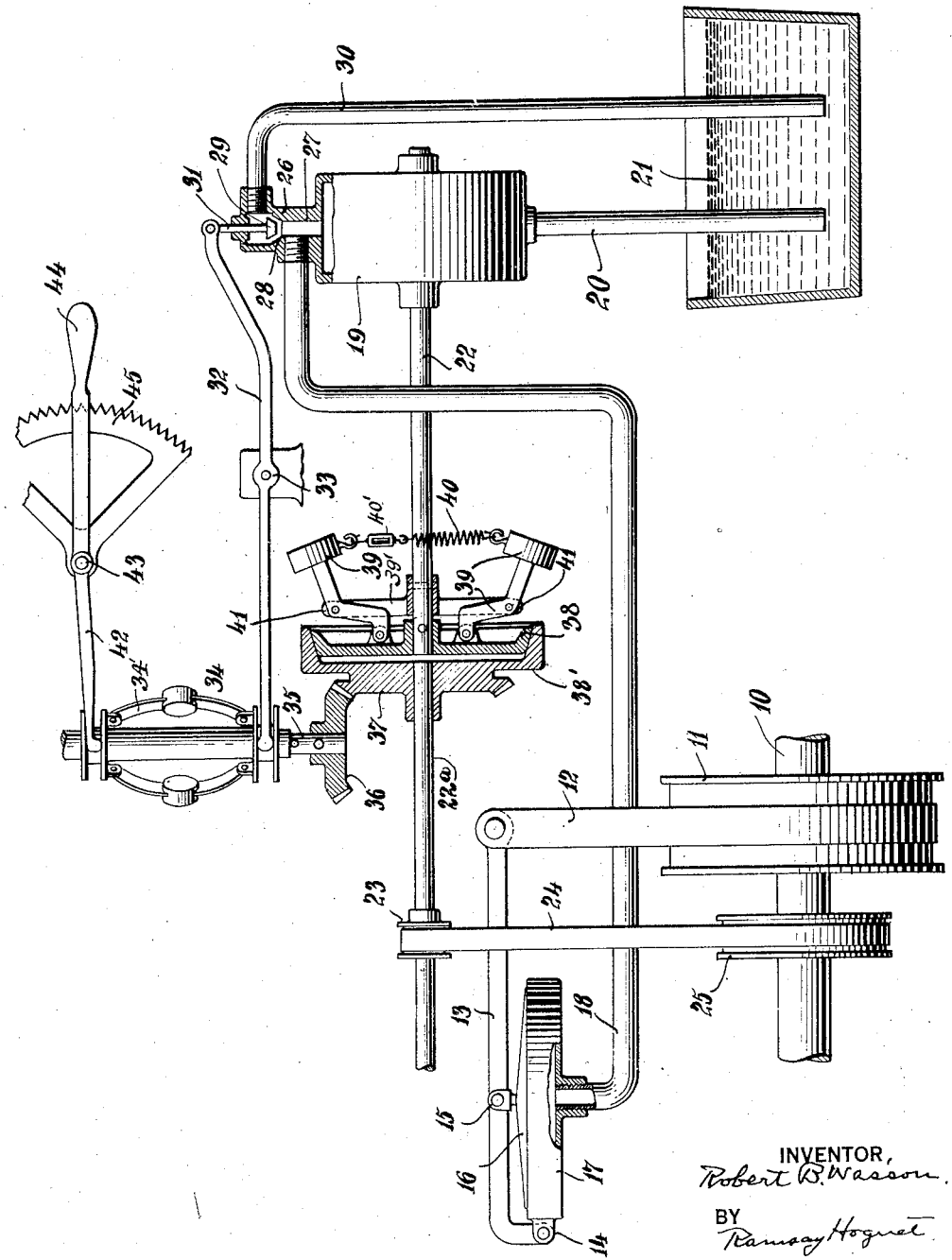
INVENTOR,
Robert B. Wasson.
BY
Ramsay Hoguet
ATTORNEY Patented Sept. 3, 1929.

1,726,599

UNITED STATES PATENT OFFICE.

ROBERT B. WASSON, OF CRANFORD, NEW JERSEY.

METHOD OF AND MEANS FOR REGULATING SPEED.

Application filed November 20, 1925. Serial No. 70,428.

My invention relates to improvements in speed regulating means and methods, and unlike speed regulators generally, the object of the invention is to control the speed of a given part as the energy imparted to it varies, as for instance a drum brake, by varying the load directly as the energy and speed vary; that is to say if the energy and consequently the speed increases, the load correspondingly, simultaneously and automatically increases to compensate for this and thus maintain the speed substantially constant, and if, conversely, the energy and speed decrease, the load is simultaneously and automatically lightened to the same end, and thus the load variations keep the speed substantially constant. My invention while applicable to regulating speeds of various parts particularly if under test, is peculiarly adapted for use in connection with a system in which various parts of an automobile, and particularly the engine and power transmitting members and brakes, are tested to see if all parts are functioning up to the desired standard. In testing the horse power and efficiency of an engine, computations are made from the fuel consumption, the speed, the load, torque, etc., and in order that computations may be readily made, it is desirable to have one of these factors as nearly constant as possible to afford a definite basis of comparison and computation. My invention, therefore, is especially adapted for use in connection with a drum brake which as is known, is a common element in testing engine efficiency. In carrying out my invention I employ means for varying the load on a brake drum directly with the energy and speed variations, and use a mechanism driven by the drum or some part turning in definite relation thereto, to effect such load variations.

Furthermore I employ means for quickly varying the maximum load and changing the maintained speed through a wide range. A pair of governors controlling the load varying means is also employed, one governor acting to operate a slipping clutch and a second governor, which can be set to limit the ultimate load at any speed and acting to supplement the operation of the clutch governor so to increase or decrease the load up to a certain point. All of which will be better understood from the description which follows.

Reference is to be had to the accompanying drawings forming a part of this specification, in which similar reference characters indicate corresponding parts.

The drawing is a broken diagrammatic elevation partly in section showing a structure embodying my invention and a means for carrying out my improved method.

The drawing is by way of example, however, and when my method is understood it will be seen that the structure for carrying it into effect can be greatly changed without affecting the principle of the invention, although there are certain features of construction which I believe to be novel and which will be defined in the claims.

The countershaft 10 represents the shaft to which the power is applied from the engine or rear wheels of the car being tested and the torque is measured by the resistance to the brake drum 11 which can be a conventional drum having the ordinary brake band 12. This band is operated in the example given by a lever 13 which at one end is pivoted as shown at 14 and is also connected by a link 15 with the diaphragm 16 operating in the casing 17. The latter connects by a pipe 18 with a pump 19 which is shown as a conventional centrifugal pump, and this has an intake pipe 20 connecting with a source of liquid supply 21 which is preferably oil, but which of course can be any suitable liquid. Any other suitable type of positive acting pump may be employed.

The pump 19 is driven by a shaft 22 which connects through a governor controlled clutch with shaft 22ᴬ and pulley 23, belt 24, and pulley 25, with the shaft 10, but obviously any driving connection between the shaft 10 and its drum 11 on the shaft 22 can be used. The essential thing is to have the driving member and pump driven in definite relation to the speed of the shaft 10, and which will operate the load controlling means herein referred to.

It will be seen from the description so far given that as the engine or wheels of the car tend to increase or decrease their speed, varying pressure will be transmitted from the pump to the diaphragm 16, and the tension of band 12 will be increased or decreased so as to tend to keep the speed constant.

The pump 19 connects with the casing 26 through a channel 27, and in the casing is a seat 28 for the valve 29 which when open permits part of the liquid to by-pass through the channel 26, casing 27, and a pipe 30 back to the source of supply. Thus the pressure against the diaphragm 16 is controlled to maintain the speed of the drum constant.

The valve 29 connects by means of the link or stem 31 with a lever 32 which is fulcrumed as shown at 33 and is operated by an initial resistance governor 34 on the vertical shaft 35, and this shaft connects by the bevel pinions 36 and 37 with one of the clutch members 38' fixed to shaft 22$^a$, while the male member 38 of the clutch is mounted for axial movement on shaft 22 and rotatable therewith due to its connection with arms 41 which are integral with a collar 39' fixed to and rotatable with shaft 22. The member 38 is normally held in engagement with the member 38' but is adapted to have an intermittently slipping connection therewith at certain speeds, its position with respect to member 38' being controlled by a governor having arms 39 pivoted to the member 38 and to a collar 39' fixed to the shaft 22. The weighted ends of the arms are connected by a spring 40 the tension of which can be regulated by a turn buckle 40' or equivalent means, and thus the slipping time of the clutch can be controlled.

The governor 34 comprises weights mounted on arcuate leaf springs 34' to which an initial tension can be given and which can be set to a certain position representing the speed it is desired to maintain by means of the lever 42 which is pivoted at 43, and is controlled by a handle 44 adapted to be locked to a toothed sector 45. This is the conventional locking means of such parts, and the details are not shown, as obviously the details of this and of the two governors can be changed as desired. The governor 34, being mounted on spring arms, may be adjusted by varying the initial resistance of the arms 34' to vary the speed at which the governor responds.

The foregoing apparatus is described as showing a means well adapted to accomplish the ends sought of accurately regulating the speed of the drum 11 by having the load varied substantially simultaneously with change in its speed in a corresponding and compensating way, and having the load varying means actuated in direct relation to the increase and decrease of the drum speed, thus tending to keep the speed of the drum constant.

The apparatus as illustrated operates in the following manner: Assuming the engine to be operated at substantially the speed desired to be maintained the pump will effect a substantially constant static pressure in the pipe 18 and the diaphragm chamber 17, the valve 29 being spaced from its seat sufficiently to permit the oil from the pump to be by-passed through pipe 30. The tension of the band 12 on the brake drum 11 will then remain constant. Should the speed of shaft 10 increase the governor 34 will move valve 39 toward its seat, increasing the resistance at this point as well as the static pressure in the diaphragm chamber. At the same time the governor arms 39 cause disengagement of the clutch members 38 and 38'. The adjustment of the spring 40 is such, however, that the disengagement of the clutch members occurs intermittently and with great rapidity, effecting a slipping connection between the clutch members and causing, in effect, a gear reduction between shafts 22 and 22$^a$. Thus, while the speed of the pump is maintained constant, the parts of the clutch 38 and governor 39 acting as a fly-wheel, the static pressure in the diaphragm chamber is increased and the increased tension on the brake band reduces the speed of the shaft 10.

From the foregoing description it will be seen that I have disclosed a very efficient means of keeping the speed of a rotary part constant through varying the load upon it, without regard to the change of energy applied to it, and it will be readily seen that while the apparatus used is novel, very many different kinds of mechanism might be utilized to carry the invention into effect.

I claim:—

1. Apparatus for maintaining the speed of a driven member substantially constant, comprising a brake for said member, means for applying the brake when a certain speed is reached, and separate means for causing the release of the brake shortly thereafter.

2. Apparatus for maintaining the speed of a driven member substantially constant, comprising a brake for said member, fluid operated means for actuating the brake for preventing overspeeding, means for maintaining substantially constant pressure of the fluid, and speed responsive means for varying the pressure of the fluid in the brake actuating means.

3. Apparatus for maintaining the speed of a driven member substantially constant, comprising a brake for said member, fluid operated means for controlling the brake, speed responsive means acting on said fluid operated means for maintaining a substantially constant pressure of the fluid on the brake and speed responsive means acting on said fluid to vary the pressure therein.

4. Apparatus for maintaining the speed of a driven member substantially constant, comprising a brake for said member, a fluid pump normally driven by said member, brake applying means controlled by the fluid pressure of the pump, a speed responsive device for maintaining a substantially constant pressure in the pump and a second speed responsive device for varying the pressure of the fluid in the brake applying means.

5. Apparatus for maintaining the speed of a driven member substantially constant, comprising a brake for said member, a fluid pump normally driven by said member, brake applying means controlled by the fluid pressure of the pump, a speed responsive clutch for maintaining a substantially constant speed of the pump, and a speed responsive device for varying the pressure of the fluid in the brake applying means.

6. Apparatus for maintaining the speed of a driven member substantially constant, comprising a brake for said member, a fluid pump normally driven by said member, brake applying means actuated by changes in the fluid pressure from said pump, a normally open by pass valve, a speed responsive device driven by said driven member, for closing the by pass valve for varying the fluid pressure and so applying the brake in case the speed of the driven member changes, and a second speed responsive device for maintaining the pressure in the pump substantially constant.

7. Apparatus for maintaining the speed of a driven member substantially constant, comprising a brake for said member, a fluid pump normally driven by said member, brake applying means actuated by changes in the fluid pressure from said pump, a normally open by pass valve, a speed responsive device driven by said driven member, for closing the by pass valve for varying the fluid pressure and so applying the brake in case the speed of the driven member changes, and a speed responsive clutch for intermittently driving the pump to maintain its speed substantially constant.

8. The method of maintaining the speed of a driven member substantially constant which comprises maintaining a substantially constant static pressure in an inelastic fluid, utilizing said pressure to brake said driven member, and substantially instantaneously changing said static pressure when the speed of the driven member varies from its desired speed.

In testimony whereof, I have signed my name to this specification this 18th day of November, 1925.

ROBERT B. WASSON.